US012634860B2

(12) United States Patent
Lo et al.

(10) Patent No.: US 12,634,860 B2
(45) Date of Patent: May 19, 2026

(54) OVER-THE-AIR TEST FOR UPLINK TRANSMIT TIMING ADJUSTMENT IN WIRELESS SYSTEMS

(71) Applicant: Nokia Technologies Oy, Espoo (FI)

(72) Inventors: Anthony Lo, Bristol (GB); Rafael Cauduro Dias De Paiva, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 260 days.

(21) Appl. No.: 18/561,200

(22) PCT Filed: Apr. 7, 2022

(86) PCT No.: PCT/US2022/023858
§ 371 (c)(1),
(2) Date: Nov. 15, 2023

(87) PCT Pub. No.: WO2023/195988
PCT Pub. Date: Oct. 12, 2023

(65) Prior Publication Data
US 2024/0259975 A1 Aug. 1, 2024

(51) Int. Cl.
*H04W 56/00* (2009.01)

(52) U.S. Cl.
CPC ... *H04W 56/0045* (2013.01); *H04W 56/0005* (2013.01)

(58) Field of Classification Search
None
See application file for complete search history.

(56) References Cited

U.S. PATENT DOCUMENTS

| | | | |
|---|---|---|---|
| 2020/0145084 A1 | 5/2020 | Yan et al. | |
| 2022/0312502 A1* | 9/2022 | Kim | H04W 74/0866 |
| 2023/0072763 A1* | 3/2023 | Kim | H04W 74/0841 |
| 2024/0292470 A1* | 8/2024 | Saha | H04B 7/0695 |

FOREIGN PATENT DOCUMENTS

| | | |
|---|---|---|
| WO | 2020/041757 A1 | 2/2020 |
| WO | 2020/264373 A1 | 12/2020 |

OTHER PUBLICATIONS

"3rd Generation Partnership Project; Technical Specification Group Radio Access Network; NR; Requirements for support of radio resource management (Release 17)", 3GPP TS 38.133, V17.4.0, Dec. 2021, 3230 pages.

(Continued)

*Primary Examiner* — Luat Phung
(74) *Attorney, Agent, or Firm* — McCarter & English LLP

(57) ABSTRACT

Systems, methods, apparatuses, and computer program products for over-the-air test for uplink transmit timing adjustment in wireless systems. A method may receiving, from a testing device, a configuration with or without a flag indicating that an uplink timing adjustment is enabled. The method may also include detecting a first path of a synchronization signal block with a delay corresponding to the target beam. The method may further include adjusting an uplink transmission timing based on the detection of the first path of the synchronization signal block.

14 Claims, 7 Drawing Sheets

(56) References Cited

OTHER PUBLICATIONS

"3rd Generation Partnership Project; Technical Specification Group Radio Access Network; NR; User Equipment (UE) conformance specification; Radio Resource Management (RRM) (Release 17)", 3GPP TS 38.533, V17.1.0, Dec. 2021, 2017 pages.

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"Clarification on test requirements for transmit timing accuracy for HD-FDD Category NB1 UE", 3GPP TSG-RN WG4 Meeting #90, R4-1900177, Qualcomm Inc, Feb. 25-Mar. 1, 2019, 8 pages.

"UE UL timing adjustment due to Rx beam change", 3GPP TSG-RAN WG4 Meeting #93, R4-1913583, Agenda: 7.10.7.1.1, Media Tek Inc, Nov. 18-22, 2019, 7 pages.

"Discussion on UE transmit timing adjustment due to UE beam switching", 3GPP TSG-RAN WG4 Meeting #90bis, R4-1903728, Agenda: 6.10.6.1.1, Huawei, Apr. 8-12, 2019, pp. 1-4.

"3rd Generation Partnership Project; Technical Specification Group Radio Access Network; NR; Physical channels and modulation (Release 17)", 3GPP TS 38.211, V17.1.0, Mar. 2022, pp. 1-135.

"3rd Generation Partnership Project; Technical Specification Group Radio Access Network; NR; Physical layer procedures for control (Release 17)", 3GPP TS 38.213, V17.0.0, Dec. 2021, pp. 1-225.

International Search Report and Written Opinion received for corresponding Patent Cooperation Treaty Application No. PCT/US2022/023858, dated Nov. 28, 2022, 18 pages.

"Remaining Issues on Timing Requirements for FR2 Hst", 3GPP TSG-RAN WG4 Meeting #102-e, R4-2205890, Agenda: 10.9.3.3, Samsung, Feb. 21-Mar. 3, 2022, 9 pages.

"On Uplink Timing in HST FR2 Deployments", 3GPP TSG-RAN WG4 Meeting #102-e, R4-2205959, Agenda: 10.9.3.3, Nokia, Feb. 21-Mar. 3, 2022, 7 pages.

"On UL Timing Adjustment in Hst FR2 Deployments", 3GPP TSG-RAN WG4 Meeting #101-bis-e, R4-2201846, Agenda: 6.9.4.4, Nokia, Jan. 17-25, 2022, 9 pages.

"Draft CR to introduce one shot large UL timing adjustment for FR2 HST UE", 3GPP TSG-RAN WG4 Meeting # 102-e, R4-2203713, Qualcomm, Feb. 21-Mar. 3, 2022, 2 pages.

Office action received for corresponding European Patent Application No. 22720146.4, dated Mar. 7, 2025, 7 pages.

Office action received for corresponding European Patent Application No. 22720146.4, dated Sep. 17, 2025, 5 pages.

* cited by examiner

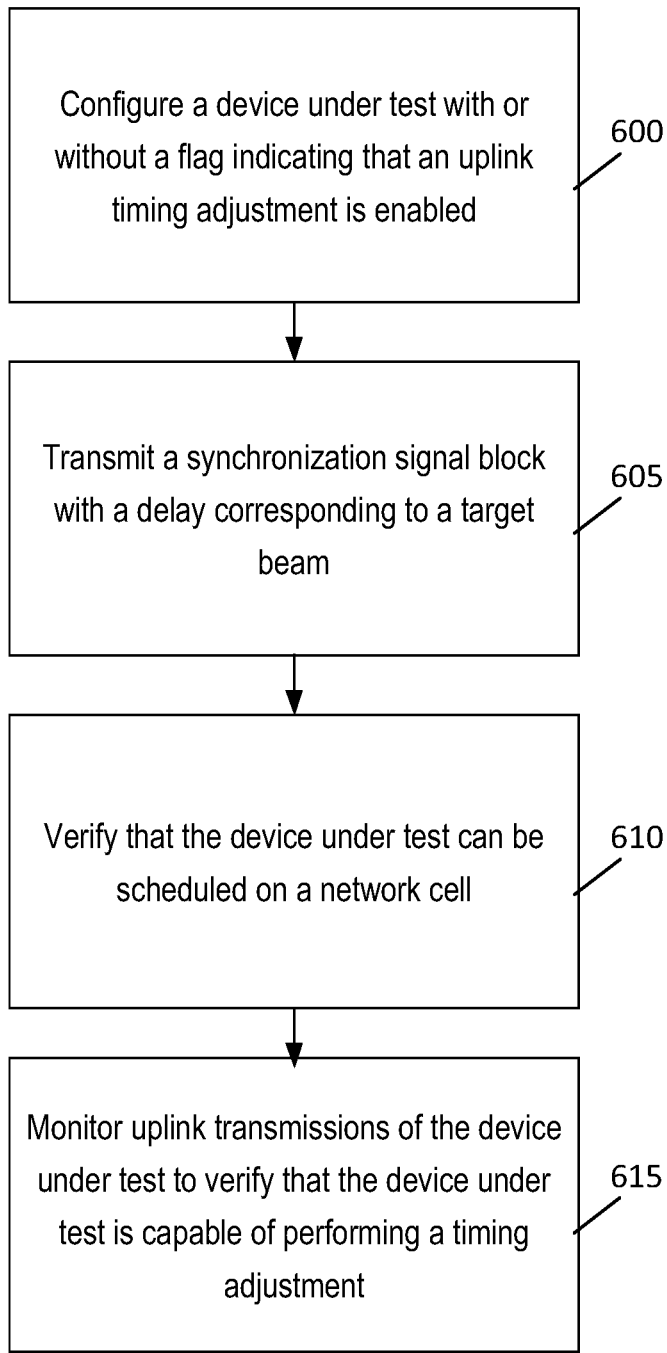

Configure a device under test with or without a flag indicating that an uplink timing adjustment is enabled — 600

Transmit a synchronization signal block with a delay corresponding to a target beam — 605

Verify that the device under test can be scheduled on a network cell — 610

Monitor uplink transmissions of the device under test to verify that the device under test is capable of performing a timing adjustment — 615

FIG. 6

OVER-THE-AIR TEST FOR UPLINK TRANSMIT TIMING ADJUSTMENT IN WIRELESS SYSTEMS

RELATED APPLICATION

This application claims priority to PCT Application No. PCT/US2022/023858 filed Apr. 7, 2022, which is incorporated herein by reference in its entirety.

FIELD

Some example embodiments may generally relate to mobile or wireless telecommunication systems, such as Long Term Evolution (LTE) or fifth generation (5G) new radio (NR), or 5G beyond, or other telecommunications systems. For example, certain example embodiments may relate to apparatuses, systems, and/or methods for over-the-air test for uplink transmit timing adjustment in wireless systems.

BACKGROUND

Examples of mobile or wireless telecommunication systems may include the Universal Mobile Telecommunications System (UMTS), Long Term Evolution (LTE), LTE-Advanced (LTE-A), LTE-A Pro, and/or fifth generation (5G) or New Radio (NR) telecommunications systems, and future generation of telecommunications systems. Fifth generation (5G) telecommunications systems refer to the next generation (NG) of radio access networks and network architectures for core networks. A 5G telecommunication system is mostly based on new radio (NR) radio access technology (5G NR), but a 5G (or NG) network can also build on E-UTRAN. It is estimated that 5G NR will provide bitrates on the order of 10-20 Gbit/s or higher, and will support at least enhanced mobile broadband (eMBB) and ultra-reliable low-latency communication (URLLC) as well as massive machine-type communication (mMTC). 5G NR is expected to deliver extreme broadband and ultra-robust, low-latency connectivity and massive networking to support the Internet of Things (IoT).

SUMMARY

Some example embodiments may be directed to a method. The method may include receiving, from a testing device, a configuration with or without a flag indicating that an uplink timing adjustment is enabled. The method may also include detecting a first path of a synchronization signal block with a delay corresponding to the target beam. The method may further include adjusting an uplink transmission timing based on the detection of the first path of the synchronization signal block.

Other example embodiments may be directed to an apparatus. The apparatus may include at least one processor and at least one memory including computer program code. The at least one memory and computer program code may also be configured to, with the at least one processor, cause the apparatus at least to receive, from a testing device, a configuration with or without a flag indicating that an uplink timing adjustment is enabled. The apparatus may also be caused to detect a first path of a synchronization signal block with a delay corresponding to the target beam. The apparatus may further be caused to adjust an uplink transmission timing based on the detection of the first path of the synchronization signal block.

Other example embodiments may be directed to an apparatus. The apparatus may include means for receiving, from a testing device, a configuration with or without a flag indicating that an uplink timing adjustment is enabled. The apparatus may also include means for detecting a first path of a synchronization signal block with a delay corresponding to the target beam. The apparatus may further include means for adjusting an uplink transmission timing based on the detection of the first path of the synchronization signal block.

In accordance with other example embodiments, a non-transitory computer readable medium may be encoded with instructions that may, when executed in hardware, perform a method. The method may include receiving, from a testing device, a configuration with or without a flag indicating that an uplink timing adjustment is enabled. The method may also include detecting a first path of a synchronization signal block with a delay corresponding to the target beam. The method may further include adjusting an uplink transmission timing based on the detection of the first path of the synchronization signal block.

Other example embodiments may be directed to a computer program product that performs a method. The method may include receiving, from a testing device, a configuration with or without a flag indicating that an uplink timing adjustment is enabled. The method may also include detecting a first path of a synchronization signal block with a delay corresponding to the target beam. The method may further include adjusting an uplink transmission timing based on the detection of the first path of the synchronization signal block.

Other example embodiments may be directed to an apparatus that may include circuitry configured to receive, from a testing device, a configuration with or without a flag indicating that an uplink timing adjustment is enabled. The apparatus may also include circuitry configured to detect a first path of a synchronization signal block with a delay corresponding to the target beam. The apparatus may further include circuitry configured to adjust an uplink transmission timing based on the detection of the first path of the synchronization signal block.

Certain example embodiments may be directed to a method. The method may include configuring a device under test with or without a flag indicating that an uplink timing adjustment is enabled. The method may also include transmitting a synchronization signal block with a delay corresponding to a target beam. The method may further include verifying that the device under test can be scheduled on a network cell. In addition, the method may include monitoring uplink transmissions of the device under test to verify that the device under test is capable of performing a timing adjustment.

Other example embodiments may be directed to an apparatus. The apparatus may include at least one processor and at least one memory including computer program code. The at least one memory and computer program code may be configured to, with the at least one processor, cause the apparatus at least to configure a device under test with or without a flag indicating that an uplink timing adjustment is enabled. The apparatus may also be caused to transmit a synchronization signal block with a delay corresponding to a target beam. The apparatus may further be caused to verify that the device under test can be scheduled on a network cell. In addition, the apparatus may be caused to monitor uplink transmissions of the device under test to verify that the device under test is capable of performing a timing adjustment.

Other example embodiments may be directed to an apparatus. The apparatus may include means for configuring a device under test with or without a flag indicating that an uplink timing adjustment is enabled. The apparatus may also include means for transmitting a synchronization signal block with a delay corresponding to a target beam. The apparatus may further include means for verifying that the device under test can be scheduled on a network cell. In addition, the apparatus may include means for monitoring uplink transmissions of the device under test to verify that the device under test is capable of performing a timing adjustment.

In accordance with other example embodiments, a non-transitory computer readable medium may be encoded with instructions that may, when executed in hardware, perform a method. The method may include configuring a device under test with or without a flag indicating that an uplink timing adjustment is enabled. The method may also include transmitting a synchronization signal block with a delay corresponding to a target beam. The method may further include verifying that the device under test can be scheduled on a network cell. In addition, the method may include monitoring uplink transmissions of the device under test to verify that the device under test is capable of performing a timing adjustment.

Other example embodiments may be directed to a computer program product that performs a method. The method may include configuring a device under test with or without a flag indicating that an uplink timing adjustment is enabled. The method may also include transmitting a synchronization signal block with a delay corresponding to a target beam. The method may further include verifying that the device under test can be scheduled on a network cell. In addition, the method may include monitoring uplink transmissions of the device under test to verify that the device under test is capable of performing a timing adjustment.

Other example embodiments may be directed to an apparatus that may include circuitry configured to configure a device under test with or without a flag indicating that an uplink timing adjustment is enabled. The apparatus may also include circuitry configured to transmit a synchronization signal block with a delay corresponding to a target beam. The apparatus may further include circuitry configured to verify that the device under test can be scheduled on a network cell. In addition, the apparatus may include circuitry configured to monitor uplink transmissions of the device under test to verify that the device under test is capable of performing a timing adjustment.

BRIEF DESCRIPTION OF THE DRAWINGS

For proper understanding of example embodiments, reference should be made to the accompanying drawings, wherein:

FIG. 6 illustrates an example flow diagram of another method, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for over-the-air (OTA) and conducted test for a large uplink transmit timing adjustment in wireless systems.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably. Additionally, the term "gNB" may be an example of a "node".

Figure 1:
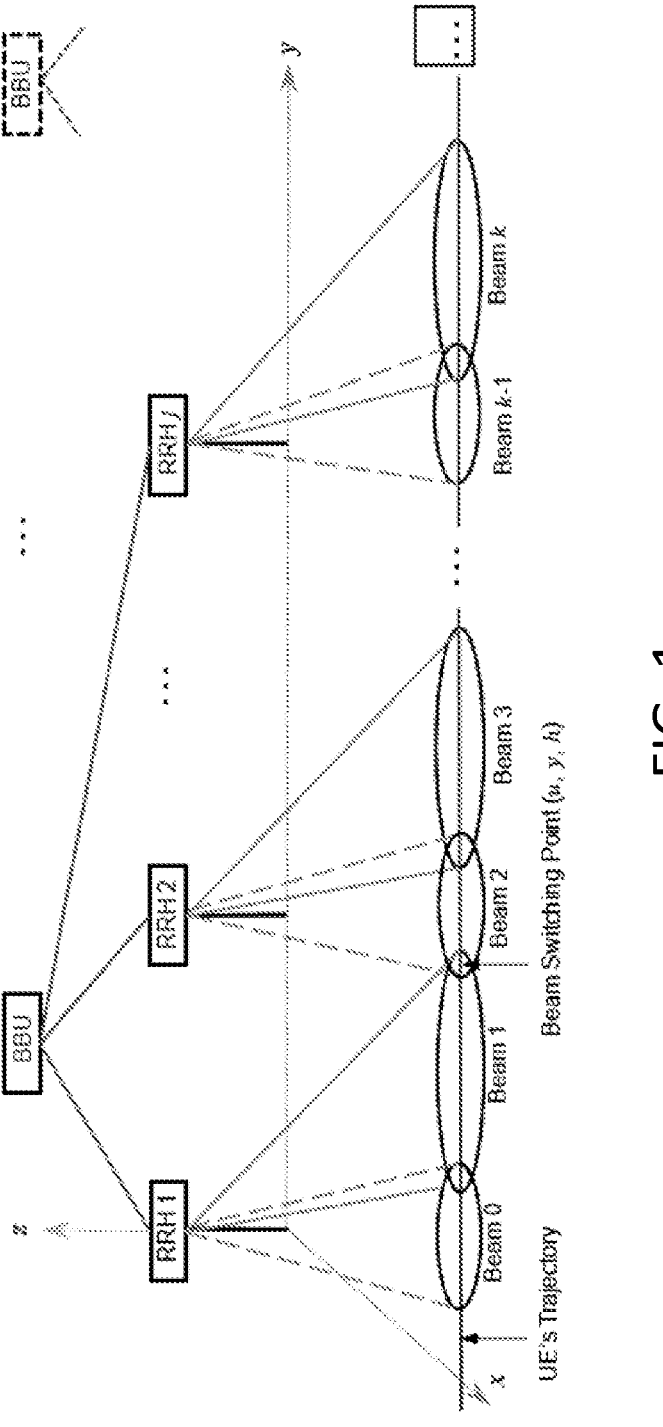
FIG. 1 illustrates an example unidirectional deployment scenario for trains.

FIG. 1 illustrates an example unidirectional deployment scenario for trains. In technical standards of the 3$^{rd}$ Generation Partnership Project (3GPP), 5G new radio networks may include beam-based coverage rather than cell-based coverage. The 5G network may generate a grid of directional beams to cover the entire cell. As illustrated in the example of FIG. 1, the beams generated by the network are all oriented in the same direction, which exhibit a unidirectional deployment scenario. In FIG. 1, one or more remote radio heads (RRHs) (i.e., transmission points) are connected to one baseband unit (BBU), which forms a single cell. Within a cell, the BBU may generate a grid of K beams which are divided into a number of subgroups; each subgroup may be allocated to a different RRH covering a distinct segment of the user equipment's (UE's) trajectory.

As illustrated in the example of FIG. 1, beams 0 and 1 are transmitted by RRH 1, beams 2 and 3 by RRH 2, and so on. Further, beam k is transmitted by RRH j at a specific time, and is directed toward a specific segment of the trajectory, and then followed by beam k+1 until all the K beams are completely swept. As the UE moves from the coverage of one beam to another, the network may automatically switch the UE to a new target beam, ensuring seamless beam mobility. In addition, when the serving and target beams belong to different RRHs, such a beam switch is known as inter-RRH beam switch. However, when the serving and target beams belong to the same RRH, it is known as intra-RRH beam switch. The UE may be informed of the beam change via medium access control control element (MAC CE) signaling indicated through a new transmission configuration indication (TCI) state. The TCI state, which is associated with a particular beam, specifies reference signals that are used as a quasi co-location (QCL) source.

3GPP also specifies a new radio resource management (RRM) requirement for new radio support for high-speed train scenarios in the millimeter-wave frequency range (i.e., frequency range 2-1) in Section 7.1.2.3 of 3GPP TS 38.133, which should be fulfilled by UE products during conformance testing. The aforementioned new RRM requirement is known as a one-shot large uplink (UL) timing adjustment, which may be used to handle large one-way differential propagation delay in the downlink (DL) between the signal of the serving beam and the target beam. In this case, the differential propagation delay may exceed the cyclic-prefix length of both 120-kHz and 240-kHz subcarrier spacing. Such a large differential propagation delay may occur when inter-RRH beam switches take place.

Referring to Section 7.1.2.3 in 3GPP TS 38.133, the requirement for the one-shot large UL timing adjustment is defined as follows:

When largeOneStepJL-timingFR2-r17 is enabled for UE supporting FR2 power class 6, the requirement in clause 7.1.2.1 does not apply to the first UL transmission after a TCI state switch. The UE transmit timing immediately after TCI state switch shall be $T_{new}-(N_{TA}+N_{TA\ offset})+2\times(T_{old}-T_{new})$, where $T_{new}$ (in $T_c$ units) is the DL timing defined as the time when UE receives downlink frame with new target TCI state.

$T_{old}$ (in $T_c$ units) is the DL timing defined as the time when UE receives downlink frame with old source TCI state.

The UE transmission timing error after the TCI state switching procedure shall be less than or equal to $\pm[9]\times64\times T_c$, and the reference point shall be the downlink timing of the new TCI state minus $(N_{TA}+N_{TA\ offset})+2\times(T_{old}-T_{new})$.

As one example, it may be assumed that the beam switching point is (u, y, h), and the one-way differential propagation delay $\tau$ (in $T_c$ units, where $T_c=1/(480\ 000\times4096)$ seconds is the basic timing unit for 5G NR systems defined in 3GPP TS 38.211) is defined by $\tau=t_{target}-t_{serving}$, where $t_{target}$ is the one-way time delay for a signal traversing in free space over distance $r_{j+1}$ from RRH j+1 to UE at the switching position, and $t_{serving}$ is the one-way time delay for a signal traversing in free space over distance $r_j$ from RRH j to UE at the switching position. Irrespective of intra- or inter-RRH beam switching, the UE transmit timing immediately after beam switching is equal to $T_{new}-(N_{TA}+N_{TA\ offset})-2\tau$, where $T_{new}$ (in $T_c$ units) is the downlink timing which is defined as the time when the UE receives downlink frame with new target beam. Further, $N_{TA\ offset}$ is the fixed timing advance offset value specified in Table 7.1.2-2 of 3GPP TS 38.133, and $N_{TA}$ is timing advance value ranging from 0 to 63 sent by the BBU to the UE. $(N_{TA}+N_{TA\ offset})$ corresponds to the Timing Advance applied by the UE.

If the beam switch occurs at slot n and the target TCI state is known to the UE, the UE can still continue to receive physical downlink control channel (PDCCH) from the serving beam until slot $$n + T_{HARQ} + 3N_{slot}^{subframe,\mu},$$

6 where $T_{HARQ}$ is the timing between DL data transmission and acknowledgement as specified in 3GPP TS 38.213, and $$3N_{slot}^{subframe,\mu}$$

is the number of slots per subframe for subcarrier spacing (SCS) configuration μ of the PDCCH transmission. Afterwards, the UE can begin receiving PDCCH transmissions from the new target beam at orthogonal frequency division multiplexing (OFDM) symbol m of the first slot which is following slot $$n + T_{HARQ} + 3N_{slot}^{subframe,\mu} +$$
$$TO_k(T_{first-SSB} + T_{SSB-proc} + T_{RS} + T_{RS-proc})/NR\_slot\_length$$

as specified in Section 8.10.3A of TS 38.133, which takes into account the processing and synchronization times required by the UE after receiving a MAC-CE TCI state switch command. This expression provides an indication of when the TCI state should be ready. Here, $TO_k=1$ if the target TCI state is not in the active TCI state list for PDSCH. Otherwise, $TO_k=0$. $T_{first-SSB}$ IS the time to the first synchronization signal block (SSB) transmission after MAC-CE carrying the beam switch command is decoded by the UE, and $T_{RS}$ is the time to the first reference signal (which can be either SSB or tracking reference signal ($T_{RS}$)) transmission after the SSB is received during $T_{first-SSB}$ is processed by the UE. $T_{SSB-proc}$ and $T_{RS-proc}$ are the processing times of SSB and reference signals, respectively. $TO_k=1$, m=0 if target TCI state is not in the active TCI state list for PDSCH, otherwise $TO_k=0$, m=1. If the beam switch occurs at slot n and the TCI state is not known to the UE, the UE can still continue to receive physical downlink control channel (PDCCH) from the serving beam until slot $$n + T_{HARQ} + 3N_{slot}^{subframe,\mu}.$$

Afterwards, the UE can begin receiving PDCCH transmissions from the new target beam at the first slot following slot $$n + T_{HARQ} + 3N_{slot}^{subframe,\mu} + T_{L1-RSRP} +$$
$$TO_{uk}(T_{first-SSB} + T_{SSB-proc} + T_{RS} + T_{RS-proc})/NR\_slot\_length$$

as defined in Section 8.10.3 of 3GPP TS 38.133, where $T_{L1-RSRP}$ is the time for receive beam refinement in Frequency Range 2-1 and $TO_{uk}=1$ for CSI-RS based L1-RSRP measurement, and 0 for SSB based L1-RSRP measurement when TCI state switching involves QCL-TypeD. However, currently, 3GPP specifications do not specify any OTA test methodology to demonstrate whether the UE can satisfy the aforementioned new RRM requirement.

Figure 2:
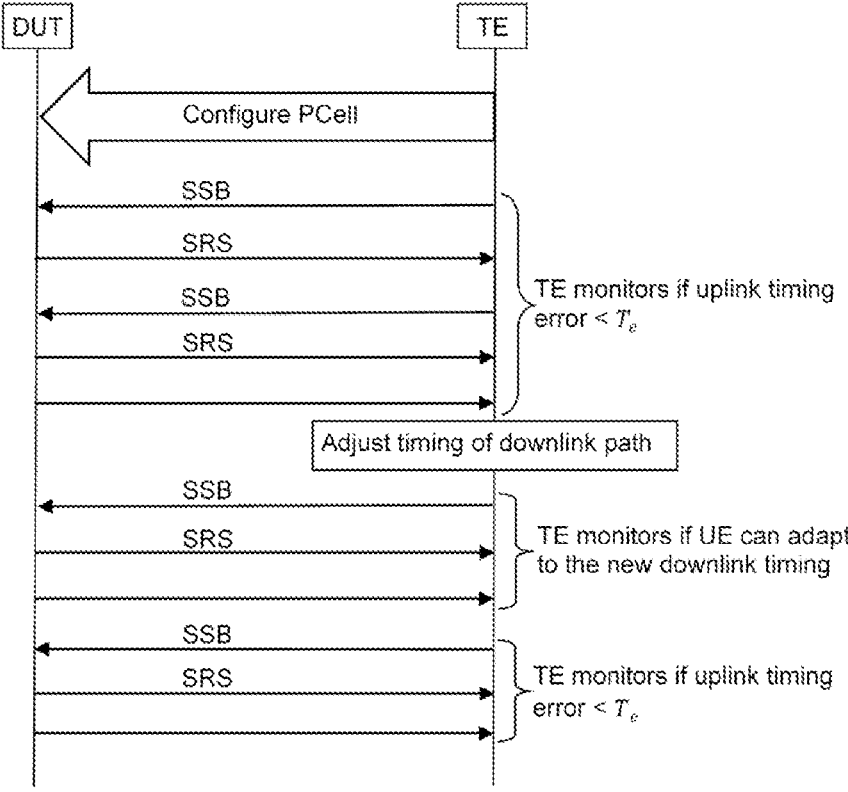
FIG. 2 illustrates an example of signaling message sequence used for testing a user equipment (UE) UL transmit timing accuracy according to Section A.7.4.1 in 3GPP TS 38.133.

FIG. 2 illustrates an example signaling message sequence used for testing a UE UL transmit timing accuracy according to Section A.7.4.1 in 3GPP TS 38.133. As described in 3GPP specifications, the UL transmit timing error is currently verified through RRM test cases. One example of such test case for FR2-1 is where test equipment (TE) is configured to behave as a gNB, and monitors the UE transmit timing to verify that its timing error does not exceed the limit specified by $T_e$, which is the transmission timing error limit for UL signals and is defined in Section 7.1.2 of 3GPP TS 38.133 for 5G NR devices. The test equipment may be computer hardware equipment/device(s) that verifies if the UE is performing in accordance to the specification. It may also be used to perform verification of functionality, and may be used during conformance testing. This means that UEs that declare a given feature have to be tested for this functionality whenever there are conformance tests for that feature. The sequence illustrated in FIG. 2 may be exemplified by procedures involved in this test, which may include a setup and configuration phase, an UL timing monitoring phase, an adjustment of the DL path, monitoring of gradual time adjustment, and an UL timing monitoring phase.

In the setup and configuration phase, the TE may configure a PCell to be used in the test and transmission of SSBs. A device under test (DUT), which may be a UE product undergoing testing for compliance with requirements set in the 3GPP technical specifications, may be configured with a sounding reference signal (SRS), which may be used by the TE to determine its timing accuracy. Other examples of the DUT may include a mobile phone supporting 5G NR, a customer premises equipment (CPE), a development UE that includes a chipset to be tested, or other similar devices supporting 5G NR functionality as a UE. Under the setup and configuration phase, during the entire test, the TE may act as a gNB, which means that it is transmitting SSB and control signals messages.

In the UL timing monitoring phase, the TE may monitor UL transmissions from the DUT, and verify if they meet the required UL transmission timing error limit $T_e$ (e.g., $T_e=9\times 64\times T_c$ seconds as specified in clause 7.1.2.3 of 3GPP TS 38.133). In some cases, the UE uplink transmission timing error requirement may correspond to $<T_e$). For 5G NR, the UE UL transmission timing error requirement is that UE UL transmission timing should be within the limits of $(N_{TA}+N_{TA\_offset})\times T_c-T_e$ seconds and $(N_{TA}+N_{TA\_offset})\times T_c+T_e$ seconds. These two expressions respectively define the upper and lower boundaries within which the UL timing have to be limited in order to meet the requirements. Thus, when $T_{perfect}=(N_{TA}+N_{TA\_offset})\times T_c$, the expressions can simply be understood as $T_{perfect}\pm T_e$, and $T_c=1/(480\ 000\times4096)$ corresponds to the basic timing unit defined in 3GPP TS 38.211. In the adjustment of the DL path, a constant time shift may be applied to the DL path by the TE. This causes an abrupt change in the DL time reference for the DUT, and enables observation of the DUT behavior after the abrupt change. That is, the adjustment means that the TE changes the time it is transmitting the DL signals so that it can monitor how the UE behaves. If the UL timing error is greater than $T_e$, the UE should fail the test.

During the monitoring of the gradual time adjustment, the DUT is expected to gradually reduce the UL transmit timing error by applying adjustments within the time adjustment step $T_q$ (maximum aggregate adjustment rate) and minimum aggregate adjustment rate $T_p$ as specified in Section 7.1.2 of 3GPP TS 38.133. The time adjustment step $T_q$ may correspond to the amount of adjustments the UE may perform independently in one adjustment, and also $T_q$ for the aggregate adjustment in 200 ms. The TE may also monitor if the DUT is capable of applying a gradual timing adjustment. For instance, when the transmission timing error between the UE and the reference timing exceeds $\pm T_c$, then the UE is required to adjust its timing to within $\pm T_c$. The reference timing can be $(N_{TA}+N_{TA\ offset})\times T_c$ before the DL timing of the reference cell. The adjustments made to the UE UL timing may follow these rules: 1) The maximum amount of the magnitude of the timing change in one adjustment shall be $T_q$; 2) The minimum aggregate adjustment rate shall be $T_p$ per second; and 3) The maximum aggregate adjustment rate shall be $T_q$ per 200 ms.

In the UL timing monitoring phase, the TE may monitor UL transmissions and verify if they meet the UE UL transmission timing error requirement. After the DUT is capable of adjusting to the abrupt change in the timing of the DL path, it is expected that it is again transmitting UL within $$(N_{TA}+N_{TA\_offset})\times T_C-T_e \text{ and } (N_{TA}+N_{TA\_offset})\times T_C+T_e.$$

Another test case may involve an active TCI state switch delay. In particular, there may be two type so tests including, for example, one for MAC-CE based active TCI state switch, and another for radio resource control (RRC) based active TCI state switch. In both cases, a similar procedure may be used with differentiation on whether RRC or MAC-CE is used to trigger the TCI state switch. The procedures for the MAC-CE may include functions that occur before the actual test starts, when only SSB from TCI-state0 is transmitted, transmitting SSB corresponding to TCI-state1, TE sending a MAC-CE command indicating switching to TCI-state1, verification of the DUE can schedule on the PCell on TCI-state0, and verification of the TCI state switch by scheduling on TCI-state1.

In the initial procedure before the actual test starts, the DUT may be connected to Cell 1 (PCell). Additionally, the DUT may be configured with two TCI states for the PCell; PDCCH-TCI-state0 (QCL'd to SSB0), and PDCCH-TCI-state1 (QCL to SSB1). The DUT may be indicated in TCI-state0 as the active TCI state, and may be configured to provide periodic layer 1-reference signal received power (L1-RSRP) reports.

Following the actions taken before the actual test starts, in the first procedure, only the SSB may be transmitted from TCI-state0. At this stage, the DUT is not expected to detect relevant RSRP levels for SSB1. In the second procedure, the SSB corresponding to TCI-state1 is transmitted. At this stage, the DUT may already measure RSRP for SSB1, and may provide an L1-RSRP report with SSB0 and SSB1 to the TE.

In the third procedure, the TE may send a MAC-CE command to the UE indicating switching to TCI-state1. The command may be sent at a slot n, which is no later than 1280 ms after the UE sent the L1-RSRP report with SSB0 and SSB1. In the fourth procedure, until slot $n+T_{HARQ}+3$ ms (where 3 ms is $$3N_{slot}^{subframe,\mu})$$

the TE verifies that the DUT can be scheduled on the PCell on TCI-state0 until $n+T_{HARQ}+3$ ms. The TE may also verify the TCI state switch time in the PCell by scheduling the UE on TCI-state1 after $n+T_{HARQ}+3$ ms ($T_{first-SSB}+T_{SSB-proc}$). For instance, the TE may send a DCI and verify if the UE can transmit/receive in the new TCI state. In this time interval, the DUT may still be able to receive on TCI-state0. In the fifth procedure, after slot $n+T_{HARQ}+3$ ms$+T_{first-SSB}+T_{SSB-proc}$, the TE may verify the TCI state switch by scheduling on TCI-state1. At this state, the TCI state switch should be completed, and the DUT should be able to start receiving on TCI-state1.

Due to the large propagation difference in downlink during beam switching for high-speed train scenarios, the legacy RRM requirements (e.g., the maximum autonomous time adjustment procedure) defined in 3GPP cannot be applied. As a result, the one-shot large uplink timing adjustment requirement is specified. Since the test methods correspond to the legacy RRM requirements are not catered for such a large differential propagation delay, they cannot be used to demonstrate compliance. Thus, as discussed herein, certain example embodiments may specify over-the-air test methods which can be used to show that the behavior of UE complies with the one-shot large uplink timing adjustment requirement following a successful beam switch.

Figure 3:
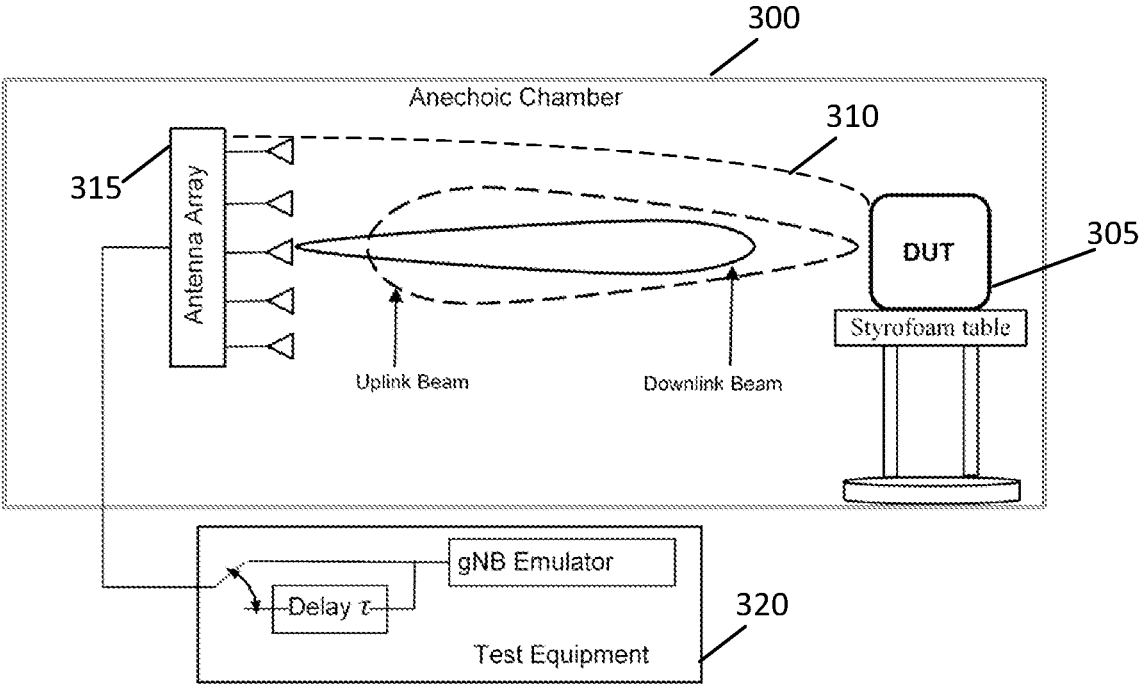
FIG. 3 illustrates an example test system in an anechoic chamber, according to certain example embodiments.

According to certain example embodiments, the OTA may be carried out in a controlled environment which may include, but is not limited to, a radio frequency (RF) anechoic chamber, a compact antenna test range chamber, or a plane wave chamber. FIG. 3 illustrates an example test system in an anechoic chamber 300, according to certain example embodiments. The anechoic chamber 300 may include a DUT 305, and a wireless communications link 310 coupling the DUT to an array of test antennas 315. The array of test antennas 315 may be connected to the TE 320 that emulates a 5G new radio gNB entity. The DUT may be placed on a non-reflective table 325 (e.g., a Styrofoam table) at a distance from the array of test antennas 315 that fulfills the far-field criteria.

Certain example embodiments may implement a MAC-CE testing procedure that can determine whether the UE behavior complies with the one-shot large UL timing adjustment requirement following a successful beam switch. For instance, in an initial configuration, the DUT may be connected to Cell 1 (e.g., PCell). The DUT may also be configured with two TCI states for the PCell including, for example, a PDCCH-TCI-state0 (QCL to SSB0) and a PDCCH-TCI-state1 (QCL'd to SSB1). Additionally, the DUT may be indicated in TCI state0 as the active TCI state, and the DUT may be configured to provide periodic L1-RSRP reports which are in turn sent to the TE.

In some example embodiments, several configurations of the DUT may be used. For instance, in one configuration, the DUT may be configured by the TE with a oneShotFlag indicating that the one-shot large UL timing adjustment is enabled. In another configuration, the DUT may be configured by the TE without a oneShotFlag indicating that the one-shot large UL timing adjustment is enabled. In other example embodiments, the one-way differential propagation delay $\tau$ may be configured (e.g., .g., this may be a test configuration, and may be a choice of the parameters of the test to be specified in the standard, or one test engineer performing this test might change it to an arbitrary value) for the SSB belonging to TCI-state1.

Figure 4:
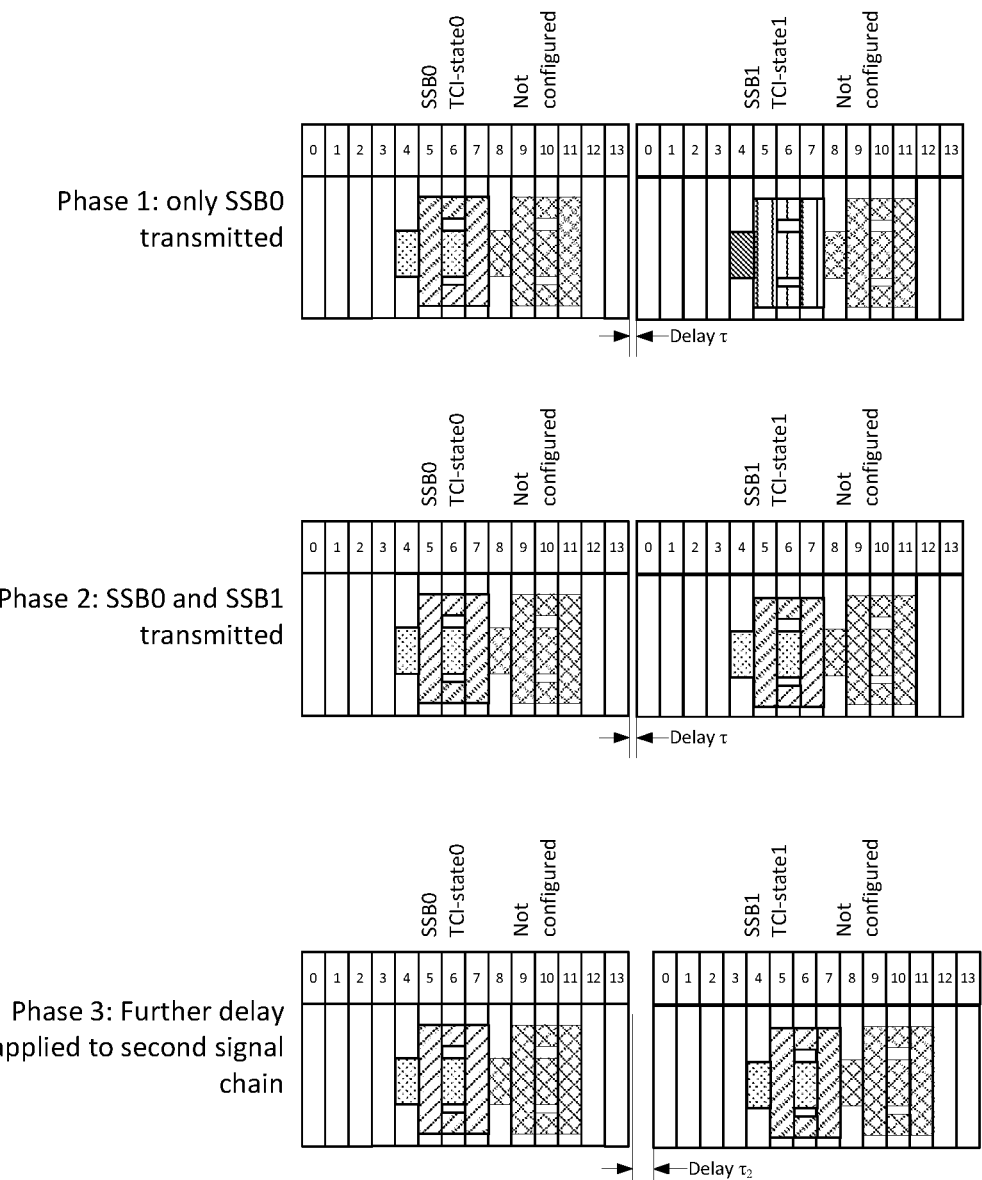
FIG. 4 illustrates an example of the state of synchronization signal block (SSB) transmissions, according to certain example embodiments.

FIG. 4 illustrates an example of the state of SSB transmissions, according to certain example embodiments. According to certain example embodiments, in the MAC-CE test procedure, only SSB0 may be transmitted as in Phase 1 of FIG. 4. At this stage, the DUT may not be expected to detect relevant RSRP levels for SSB1. As illustrated in FIG. 4, at Phase 2, SSB corresponding to TCI-state1 may be transmitted. At this stage, the DUT may already measure RSRP for SSB1, and may provide a L1-RSRP report which is in turn sent to the TE with SSB0 and SSB1. In some example embodiments, the SSB corresponding to TCI-state1 may be delayed by $\tau$.

In certain example embodiments, the TE may send a MAC-CE command to the UE (e.g., DUT) indicating switching to TCI-state 1. According to certain example embodiments, the command may be sent at slot n, which may be no later than 1280 ms after the UE sent the L1-RSRP report with SSB0 and SSB1. Until slot $$n + T_{HARQ} + 3N_{slot}^{subframe,\mu},$$

the TE may verify (e.g., whether it is currently working) that the DUT can be scheduled on the PCell on TCI-state0. In certain example embodiments, the TE may schedule resources for the UE. For instance, the TE may schedule a DL PDSCH, and monitor if the UE received the data by monitoring the HARQ response. In other example embodiments, the TCI-state0 may correspond to the resources used for this TCI state. That is, the TCI state may be a beam, or in the case of a high-speed train, a different RRH. The interaction here is that TCI-state0 may emulate a RRH in one radio tower, and the TCI-state1 may emulate another RRH in another radio tower. Up to slot $$n + T_{HARQ} + 3N_{slot}^{subframe,\mu},$$

the DUT may still be able to receive on TCI-state0. According to certain example embodiments, until slot $$n + T_{HARQ} + 3N_{slot}^{subframe,\mu},$$

the DUT may be transitioning to the new TCI state, and may be able to detect the first path of SSB1 with a delay $\tau$ corresponding to the new TCI-state.

According to certain example embodiments, after slot $$n + T_{HARQ} + 3N_{slot}^{subframe,\mu} +$$
$$TO_k(T_{first-SSB} + T_{SSB-proc} + T_{RS} + T_{RS-proc})/NR\_slot\_length,$$

the TE may verify the TCI state switch by scheduling on TCI-state1. At this state, the TCI state switch should be completed, and the DUT should be able to start receiving on TCI-state1.

According to certain example embodiments, the MAC-CE test procedure may also include an UL timing monitoring phase. In this phase, when the DUT is configured with a oneShotFlag, and such a configuration is active (i.e., one-shot time adjustment is allowed), the TE may monitor UL transmissions to verify that the UE is capable of performing one-shot time adjustment. According to certain example embodiments, the verification may be performed by the TE by configuring SRS signals to be transmitted by the UE, and by measuring the time of the transmission. If the transmitted time has an error that is larger than $T_e$, the test is considered as failed After the DUT is capable of adjusting the UL transmit timing in a single shot to the timing of the DL path, it is expected that the DUT (e.g., UE) is again transmitting UL within $(N_{TA}+N_{TA\ offset}) \times T_c + \tau \times T_c - T_e$ and $(N_{TA}+N_{TA\ offset}) \times T_c + \tau \times T_c + T_e$. $T_e$ is the timing error limit and $T_e$ may equal to $9 \times 64 \times T_c$ as specified in Section 7.1.2.3 of 3GPP TS 38.133.

According to other example embodiments, when the DUT is configured without a oneShotFlag, and such configuration is active (i.e., one-shot time adjustment is not used), the DUT may gradually reduce the UL transmit timing by applying adjustments to the UL transmit time in relation to the detected DL variation within the time adjustment step $T_q$ (maximum aggregate adjustment rate per 200 ms), and minimum aggregate adjustment rate $T_p$ per second. Additionally, the TE may monitor if the DUT is capable of applying a gradual timing adjustment, as described above.

In other example embodiments, the MAC-CE test procedure may also include an adjustment of the DL path by adjustment of the DL path by 12 as in Phase 3 illustrated in FIG. 4. In this phase, the one-way differential propagation delay 12 for the SSB belonging to TCI-state1 may be configured (e.g., this may be a test configuration, and may be a choice of the parameters of the test to be specified in the standard, or one engineer performing this test might change it to an arbitrary value). Further, at this stage, the DUT may apply adjustments which follow normal gradual time adjustments, and one-shot time adjustment is not allowed by the DUT. According to certain example embodiments, the DUT may be expected to gradually reduce the UL transmit timing by applying adjustments within the time adjustment step $T_q$, and minimum aggregate adjustment rate $T_p$. Additionally, the TE may monitor if the DU is capable of applying a gradual timing adjustment, as described above.

According to further example embodiments, the MAC-CE test procedure may include monitoring of the gradual time adjustment. In particular, the DUT may gradually reduce the UL transmit timing by applying adjustments within the time adjustment step $T_q$, and minimum aggregate adjustment rate $T_p$. Additionally, the TE may monitor if the DUT is capable of applying a gradual timing adjustment, as described above.

In addition to using MAC-CE, other example embodiments may trigger the TCI state switch by a RRC message instead of the MAC-CE. When using the RRC message, the procedures described above may change on the message that the TE sends to the DUT when indicating switching to TCI-state1. For instance, instead of the TE sending a MAC-CE command indicating switching to TCI-state1, the TE may instead send an RRC command indicating switching to TCI-state1.

Additionally, in other example embodiments, when using the RRC based state switch, the times when the UE is expected to be active in the TCI state switch may differ in relation to using MAC-CE. For instance, the UE may be expected to be able to receive the PDCCH after $n+T_{RRC\_proc}+TO_k$        $(T_{first-SSB}+T_{SSB-proc}+T_{RS}+T_{RS-proc})/$ NR_slot_length, where n is the slot in which the RRC command was received, and $T_{RRC\_proc}$ is the RRC processing delay time.

According to certain example embodiments, TCI state 0 and 1 may have a 2.4 us one-way differential propagation delay between each other. In this situation, if the UE is not capable of performing one-shot adjustment, it may be allowed to perform $T_q$ per 200 ms in accordance with the gradual timing adjustment limits described above, where $T_q=2.5\times64\times T_c=81$ ns for 120-kHz SCS. This would mean that the UE would take 30 cycles of 200 ms to be able to fully compensate for this delay. In the test procedure of certain example embodiments, it may be verified that the UE is capable of performing such adaptation in combination with the TCI state switch.

Figure 5:
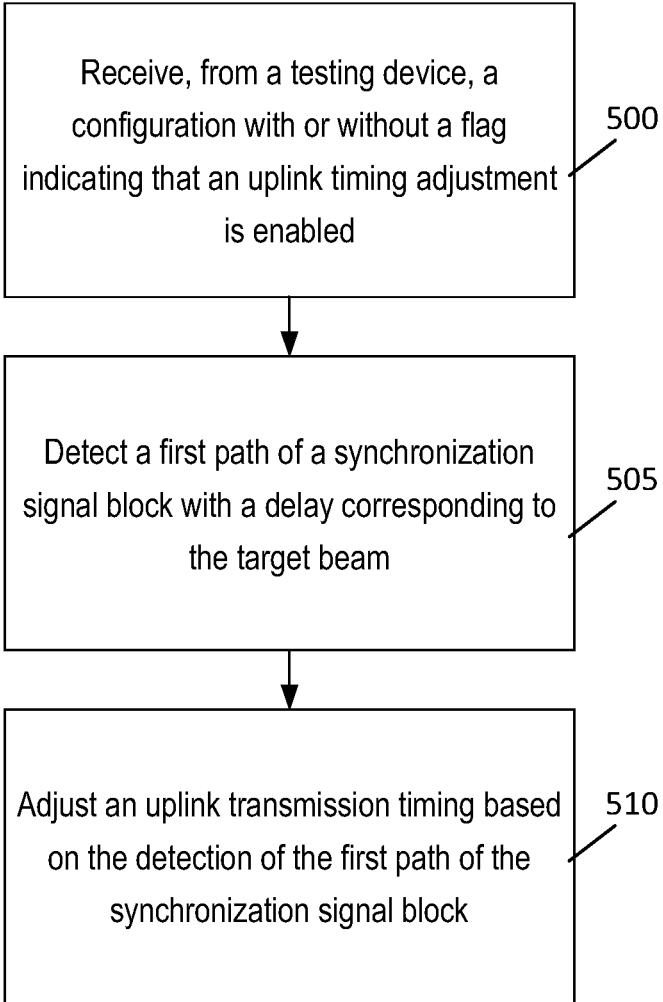
FIG. 5 illustrates an example flow diagram of a method, according to certain example embodiments.

FIG. 5 illustrates an example flow diagram of a method, according to certain example embodiments. In an example embodiment, the method of FIG. 5 may be performed by a DUT emulating a UE entity in a 3GPP system, such as LTE or 5G-NR. For instance, in an example embodiment, the method of FIG. 5 may be performed by device similar to one of apparatuses 10 or 20 illustrated in FIG. 7.

According to certain example embodiments, the method of FIG. 5 may include, at 500, receiving, from a testing device, a configuration with or without a flag indicating that an uplink timing adjustment is enabled. At 505, the method may also include detecting a first path of a synchronization signal block with a delay corresponding to the target beam. At 510, the method may further include adjusting an uplink transmission timing based on the detection of the first path of the synchronization signal block.

According to certain example embodiments, the method may further include receiving a medium access control-control element command comprising an indication of a beam switch from a serving beam to a target beam, or receiving a radio resource control command indicating switching from the serving beam to the target beam. According to some example embodiments, the configuration may include a first configuration or a second configuration. According to other example embodiments, the first configuration may include configuration information and the flag indicating that one-shot large uplink timing adjustment is enabled. According to further example embodiments, the second configuration may include configuration without the flag indicating that one-shot large uplink timing adjustment is enabled.

In certain example embodiments, reception of the synchronization signal block corresponding to the target beam may be delayed by a one-way differential propagation delay. In some example embodiments, the one-way differential propagation delay may be defined by a difference between a one-way time delay value of a signal from a target transmission point, and a one-way time delay value of a signal from a serving transmission point. In other example embodiments, the adjustment of the uplink transmission timing may include performing a one-shot time adjustment of the uplink transmission timing to a transmission timing of a downlink path, or performing a gradual reduction of the uplink transmission timing by applying a plurality of adjustments. In further example embodiments, the method may also include measuring reference signal received power for the synchronization signal block, and transmitting a report of the measured reference signal received power to a network element.

FIG. 6 illustrates an example of a flow diagram of another method, according to certain example embodiments. In an example embodiment, the method of FIG. 6 may be performed by a test equipment which may emulate a 5G-NR gNB entity of in a 3GPP system. For instance, in an example embodiment, the method of FIG. 6 may be performed by an apparatus similar to one of apparatuses 10 or 20 illustrated in FIG. 6.

According to certain example embodiments, the method of FIG. 6 may include, at 600, configuring a device under test with or without a flag indicating that an uplink timing adjustment is enabled. At 605, the method may also include transmitting a synchronization signal block with a delay corresponding to a target beam. At 610, the method may further include verifying that the device under test can be scheduled on a network cell. At 615, the method may also include monitoring uplink transmissions of the device under test to verify that the device under test is capable of performing a timing adjustment.

According to certain example embodiments, the method may also include transmitting a medium access control-control element command comprising an indication of a beam switch from a serving beam to a target beam, or transmitting a radio resource control command indicating switching from the serving beam to the target beam. According to some example embodiments, the configuration may include a first configuration or a second configuration. According to other example embodiments, the first configuration may include configuration information and the flag indicating that one-shot large uplink timing adjustment is enabled. According to further example embodiments, the second configuration may include configuration without the flag indicating that one-shot large uplink timing adjustment is enabled.

In certain example embodiments, transmission of the synchronization signal block corresponding to the target beam may be delayed by a one-way differential propagation delay. In some example embodiments, the one-way differential propagation delay may be defined by a difference between a one-way time delay value of a signal from a target transmission point, and a one-way time delay value of a signal from a serving transmission point. In other example embodiments, the method may further include configuring a one-way differential propagation delay for a synchronization signal block belonging to the target beam.

Figure 7:
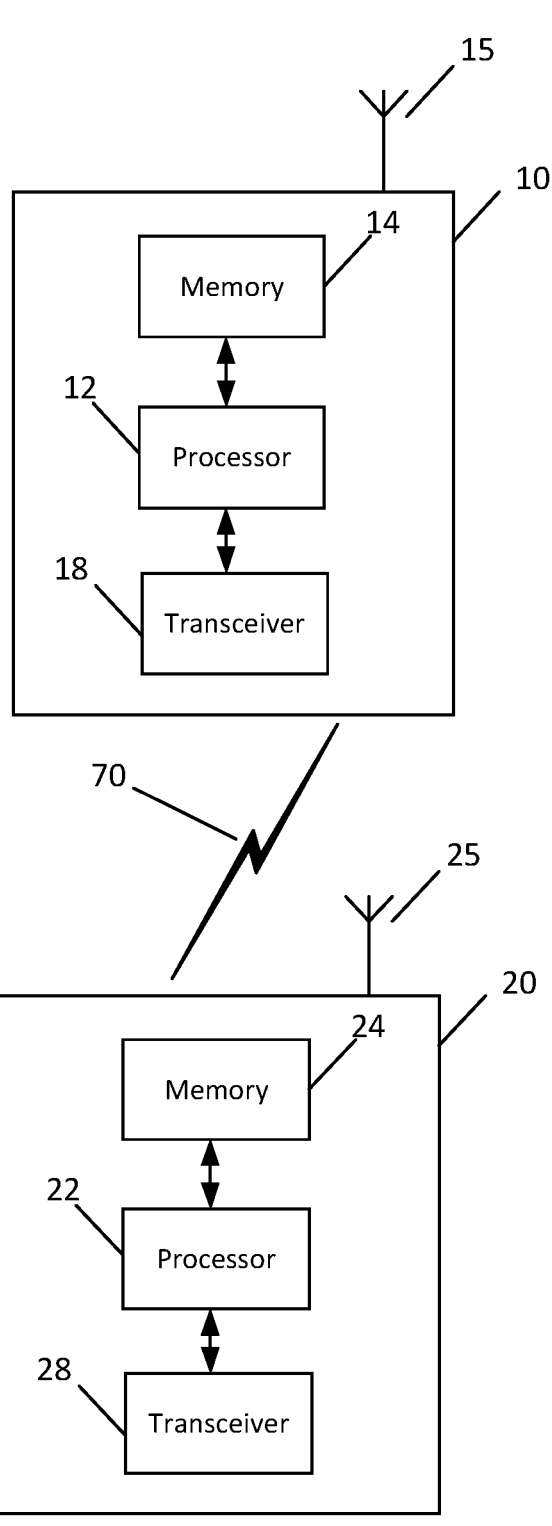
FIG. 7 illustrates a set of apparatuses, according to certain example embodiments.

FIG. 7 illustrates a set of apparatus 10 and 20 according to certain example embodiments. In certain example embodiments, the apparatus 10 may be a DUT that capable of emulating functionalities of a node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 7.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 7.

As illustrated in the example of FIG. 7, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive, from a testing device, a configuration with or without a flag indicating that an uplink timing adjustment is enabled. Apparatus 10 may also be controlled by memory 14 and processor 12 to detect a first path of a synchronization signal block with a delay corresponding to the target beam. Apparatus 10 may further be controlled by memory 14 and processor 12 to adjust an uplink transmission timing based on the detection of the first path of the synchronization signal block.

As illustrated in the example of FIG. 7, apparatus 20 may represent a TE that is capable of emulating functionalities of a network, core network element, or element in a communications network or associated with such a network, such as gNB. It should be noted that one of ordinary skill in the art would understand that apparatus 20 may include components or features not shown in FIG. 7.

As illustrated in the example of FIG. 7, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-4 and 6.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-4 and 6.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to configure a device under test with or without a flag indicating that an uplink timing adjustment is enabled. Apparatus 20 may also be controlled by memory 24 and processor 22 to transmit a synchronization signal block with a delay corresponding to a target beam. Apparatus 20 may further be controlled by memory 24 and processor 22 to verify that the device under test can be scheduled on a network cell. In addition, apparatus 20 may be controlled by memory 24 and processor 22 to monitor uplink transmissions of the device under test to verify that the device under test is capable of performing a timing adjustment.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving, from a testing device, a configuration with or without a flag indicating that an uplink timing adjustment is enabled. The apparatus may also include means for detecting a first path of a synchronization signal block with a delay corresponding to the target beam. The apparatus may further include means for adjusting an uplink transmission timing based on the detection of the first path of the synchronization signal block.

Certain example embodiments may also be directed to an apparatus that includes means for configuring a device under test with or without a flag indicating that an uplink timing adjustment is enabled. The apparatus may further include means for transmitting a synchronization signal block with a delay corresponding to a target beam. The apparatus may also include means for verifying that the device under test can be scheduled on a network cell. In addition, the apparatus may include means for monitoring uplink transmissions of the device under test to verify that the device under test is capable of performing a timing adjustment.

Certain example embodiments described herein provide several technical improvements, enhancements, and/or advantages. For instance, in some example embodiments, it may be possible to provide an OTA test to determine whether a UE can satisfy a new RRM requirement. Other example embodiments may provide an OTA test that can be used to show that the behavior of the UE complies with the one-shot large UL timing adjustment requirement following a successful beam switch. Other example embodiments may provide an OTA test that can be used to show that the UE supporting high-speed train scenarios complies with the medium access control-control element TCI state switch delay requirement.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary: | |
|---|---|
| 3GPP | 3rd Generation Partnership Project |
| 5G | 5th Generation |
| 5GCN | 5G Core Network |
| 5GS | 5G System |
| BS | Base Station |
| DL | Downlink |
| DUT | Device Under Test |
| eNB | Enhanced Node B |
| gNB | 5G or Next Generation NodeB |
| LTE | Long Term Evolution |
| MAC CE | MAC Control Element |
| NR | New Radio |
| OTA | Over-The-Air |
| PDCCH | Physical Downlink Control Channel |
| QCL | Quasi Co-Location |
| RRC | Radio Resource Control |

-continued

| Partial Glossary: | |
| --- | --- |
| RRM | Radio Resource Management |
| SSB | Synchronization Signal Block |
| TCI | Transmission Configuration Indicator |
| TE | Test Equipment |
| TRS | Tracking Reference Signal |
| UE | User Equipment |
| UL | Uplink |

We claim:

1. An apparatus, comprising:

at least one processor; and at least one memory storing instructions that, when executed by the at least one processor, cause the apparatus at least to:

configure a device under test with a flag indicating that a one-shot large uplink timing adjustment is enabled;

transmit a synchronization signal block with a delay corresponding to a target beam;

verify that the device under test is schedulable on a network cell;

transmit a medium access control-control element command comprising an indication of a beam switch from a serving beam to the target beam; and monitor uplink transmissions of the device under test to verify that the device under test was able to perform the one shot large uplink timing adjustment following the beam switch;

wherein the apparatus is a testing device configured to emulate a network entity;

transmission of the synchronization signal block corresponding to the target beam is delayed by a one-way differential propagation delay;

the one-way differential propagation delay is defined by a difference between a one-way time delay value of a signal from the target beam, and a one-way time delay value of a signal from the serving beam; and the beam switch is indicated, in the medium access control-control element command, by indicating a new transmission configuration indication state which is associated with the target beam.

2. The apparatus according to claim 1, wherein the configuration comprises a first configuration, and wherein the first configuration comprises configuration information and the flag indicating that the one-shot large uplink timing adjustment is enabled.

3. The apparatus according to claim 1, wherein the instructions, when executed by the at least one processor, further cause the apparatus at least to:

configure the one-way differential propagation delay for a synchronization signal block belonging to the target beam.

4. The apparatus according to claim 1, wherein the network entity is a 5G New Radio gNB entity.

5. The apparatus according to claim 1, wherein verifying that the device under test is schedulable on the network cell comprises verifying that the device under test is schedulable on a primary cell on a transmission configuration indication state associated with a serving beam until slot $$n + T_{HARQ} + 3N_{slot}^{subframe,\mu},$$

wherein n is a slot at which the medium access control-control element command was transmitted, $T_{HARQ}$ is a timing between downlink data transmission and an acknowledgement, and $$3N_{slot}^{subframe,\mu}$$

is the number of slots per subframe for a subcarrier spacing configuration $\mu$ of a physical downlink control channel transmission.

6. The apparatus according to claim 5, wherein $$3N_{slot}^{subframe,\mu}$$

is equal to 3 slot ms.

7. The apparatus according to claim 6, wherein the instructions, when executed by the at least one processor, further cause the apparatus at least to:

verify a transmission configuration indication state switch by scheduling the device under test on the new transmission configuration indication state associated with the target beam after slot $$n + T_{HARQ} + 3N_{slot}^{subframe,\mu} + \frac{TO_k(T_{first-SSB} + T_{SSB-proc} + T_{RS} + T_{RS-proc})}{NR\_slot\_length},$$

wherein:

$TO_k$ is equal to 1, if the new transmission configuration indication state is not in an active transmission configuration indication state list for physical downlink shared channel and, otherwise, equal to 0, $T_{first-SSB}$ is time to a first synchronization signal block transmission after the medium access control-control element command carrying the indication of the beam switch is decoded by the device under test, $T_{SSB-proc}$ is a processing time of a synchronization signal block, $T_{RS}$ is a time to a first reference signal transmission after the synchronization signal block is received within $T_{first-SSB}$, $T_{RS-proc}$ is a processing time of a reference signal, and NR_slot_length is a New Radio slot length.

8. The apparatus according to claim 1, wherein the instructions, when executed by the at least one processor, further cause the apparatus at least to:

verify that the device under test was able to perform the one-shot large uplink timing adjustment following the beam switch.

9. The apparatus according to claim 8, wherein the monitoring of the uplink transmissions of the device under test to verify that the device under test was able to perform the one-shot uplink timing adjustment comprises:

configuring, to the device under test, sounding reference signals to be transmitted by the device under test;

measuring a time of transmission of the sounding reference signals; and determining whether an error in the time of transmission of the sounding reference signals is larger than an uplink transmission timing error limit.

10. The apparatus according to claim 9, wherein the uplink transmission timing error limit is equal to or smaller than $9 \times 64 \times T_c$, $T_c$ being equal to $1/(480\ 000 \times 4096)$ seconds.

11. The apparatus according to claim 1, wherein the serving and target beams are associated with serving and target transmission points.

12. The apparatus according to claim 1, the serving and target beams are associated with two transmission configuration indication states emulating two different remote radio heads in different radio towers.

13. A method, comprising:

configuring, by a testing device emulating a network entity, a device under test with a flag indicating that a one-shot large uplink timing adjustment is enabled;

transmitting by the testing device, a synchronization signal block with a delay corresponding to a target beam;

verifying, by the testing device, that the device under test is schedulable on a network cell;

transmitting a medium access control-control element command comprising an indication of a beam switch from a serving beam to the target beam; and monitoring, by the testing device uplink transmissions of the device under test to verify that the device under test was able to perform the one-shot large uplink timing adjustment following the beam switch;

wherein transmission of the synchronization signal block corresponding to the target beam is delayed by a one-way differential propagation delay;

the one-way differential propagation delay is defined by a difference between a one-way time delay value of a signal from the target beam, and a one-way time delay value of a signal from the serving beam; and the beam switch is indicated, in the medium access control-control element command, by indicating a new transmission configuration indication state which is associated with the target beam.

14. A non-transitory computer readable medium comprising instructions that, when executed by a testing device emulating a network entity, cause the testing device to perform at least:

configuring a device under test with a flag indicating that a one-shot large uplink timing adjustment is enabled;

transmitting a synchronization signal block with a delay corresponding to a target beam;

verifying that the device under test is schedulable on a network cell; and transmitting a medium access control-control element command comprising an indication of a beam switch from a serving beam to the target beam; and monitoring uplink transmissions of the device under test to verify that the device under test was able to perform the one-shot large uplink timing adjustment following the beam switch;

wherein transmission of the synchronization signal block corresponding to the target beam is delayed by a one-way differential propagation delay;

the one-way differential propagation delay is defined by a difference between a one-way time delay value of a signal from the target beam, and a one-way time delay value of a signal from the serving beam; and the beam switch is indicated, in the medium access control-control element command, by indicating a new transmission configuration indication state which is associated with the target beam.

* * * * *